May 4, 1926.
C. MILLER
SPRING
Filed May 5, 1924
1,583,003
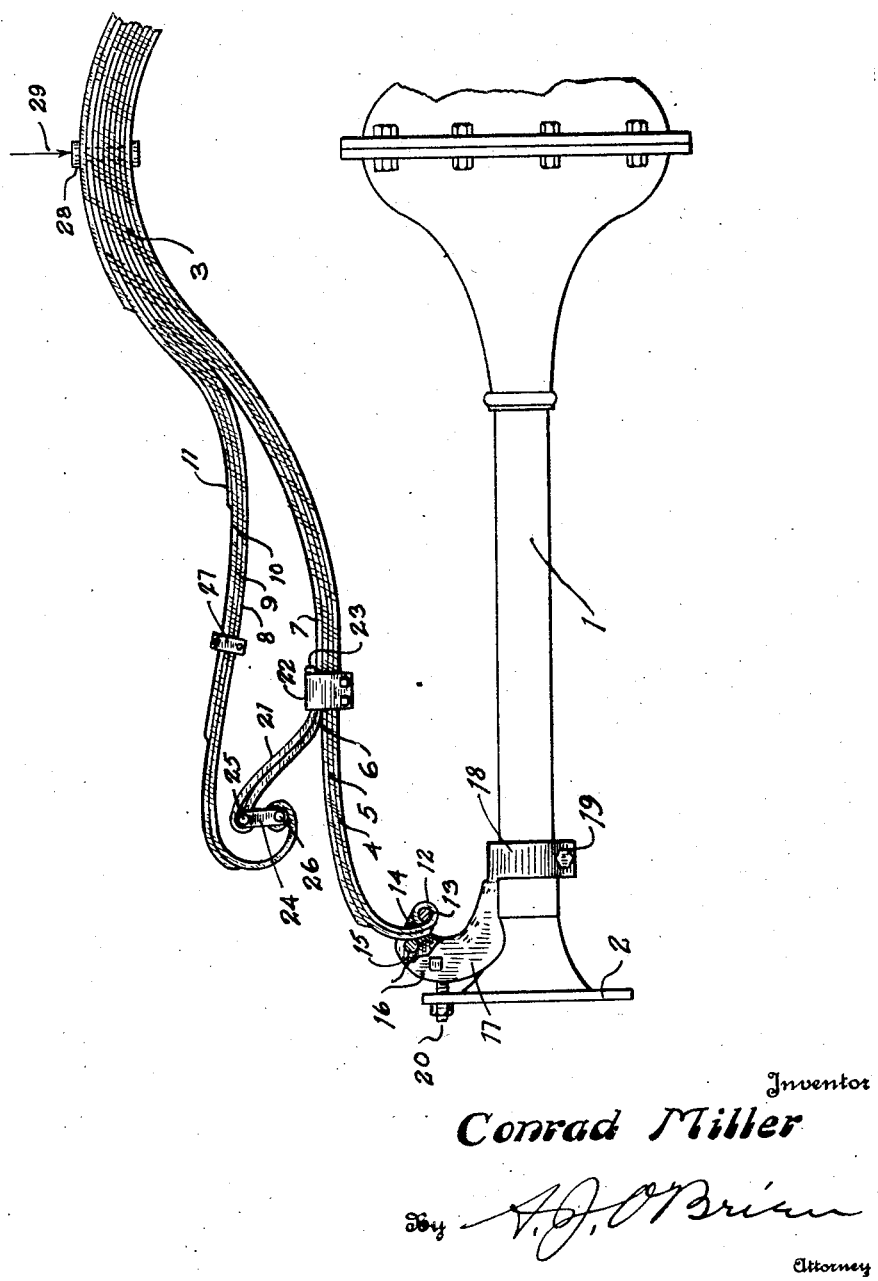
Inventor
Conrad Miller
By A. J. O'Brien
Attorney Patented May 4, 1926.

1,583,003

UNITED STATES PATENT OFFICE.

CONRAD MILLER, OF CASPER, WYOMING.

SPRING.

Application filed May 5, 1924. Serial No. 711,112.

*To all whom it may concern:*

Be it known that I, CONRAD MILLER, a citizen of the United States, residing at Casper, county of Natrona, and State of Wyoming, have invented certain new and useful Improvements in Springs; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to improvements in springs and has reference more particularly to springs of the type employed in connection with automobiles and other vehicles.

It is, of course, desirable to produce a spring suspension for vehicles that will give the best riding qualities and to prevent undue rebounds.

In order to obtain the best results, the springs should be as long as the construction will permit, as a long spring has better riding qualities than shorter ones. It is, however, a fact that a long spring will cause a more severe rebound than shorter and stiffer springs of the same type.

It is the object of this invention to produce a spring that shall be so constructed that it will have great resiliency and a minimum amount of rebound.

My invention, briefly described, consists in making the spring leaves as long as possible and separating them near their ends into two groups and then connecting the ends of the upper and shorter group with the lower group by means of shackles.

In order better and more clearly to describe my invention, I shall have reference to the accompanying drawing in which the preferred embodiment thereof is shown, and in which the single view shows my spring in place on a rear automobile axle.

Numeral 1 designates the rear axle housing of an automobile and 2 the rear axle brake housing. My spring is made up of a plurality of leaves indicated as a whole by numeral 3. The number of leaves is optional, but for the purpose of this disclosure, I have shown a spring made up of 8 leaves numbered from 4 to 11, inclusive. Leaf 4 is the master leaf and this has its ends bent into eyelets 12 for the reception of the shackle bolt 13. The spring shackle 14 has its upper end pivoted at 15 to the ends 16 of the perch 17. This perch is secured to the axle housing by means of parts 18 that encircle the same and whose ends are held together by means of a bolt 19. A bolt 20 connects the perch 17 with the brake housing 2. The leaf marked 7 is the upper leaf in the lower group and this leaf has its end bent upwardly and is doubled back on itself in the manner indicated on the drawing at the point marked 21. A yoke or clamp 22 surrounds the lower group of leaves. The end of leaf 7 extends through the clamp 22 and is bent upwardly as indicated by numeral 23. A shackle 24 is pivoted at 25 to the doubled end of the leaf 7. This shackle has a bolt 26 to which the outer end of the leaf 8 is connected. Leaf 8 may be termed the auxiliary master leaf, as it bears the same relation to the leaves 9, 10 and 11 as leaf 4 bears to leaves 5, 6 and 7. It will be noted that the outer end of the auxiliary master leaf is curved and that it encircles the shackle 24. The extreme end of leaf 8, which is connected with the shackle bolt 26, points in the direction of the center of the spring. A yoke 27 serves to hold the leaves 8, 9 and 10 against lateral displacement while a bolt 28 holds the leaves in assembled relation. The spring is symmetrical and both ends are constructed alike.

When a load is applied to the spring, the force operates in the direction of the arrow 29 and bends the spring leaves so as to permit the center to move downwardly. This force is resisted by all of the leaves. When the rebound comes, the upper set of spring leaves 8 to 11 will soon pass their neutral position and there will be developed a force tending to flex the spring leaves in the opposite direction. This force will be resisted by the spring leaves of both sections, but more especially by the leaves of the upper section, which act as snubbers to moderate and limit the rebound. My spring, owing to its peculiar construction, also helps to steady the car body.

The curved ends of the spring enable the leaves to be made of greater length and also permit the upper group of leaves to function more effectively as snubbers.

Having now described my invention, what I claim as new is:

1. A multiple leaf spring comprising two groups of leaves having their central portions concentrically curved, means for clamping the leaves together at their center points the outer portions of said groups being normally separated, the lowermost leaf of each group being a master leaf, the master leaf of the upper group being curved downwardly and inwardly, the upper leaf of the lower group having its end bent away from the other leaves of the lower group and upwardly to a point above the corresponding end of the master leaf of the upper group and a shackle connecting the said ends.

2. A multiple leaf spring comprising two groups of leaves, the several leaves of the two groups having their central portions concentrically curved, means for clamping the several leaves together at their central points, the lowermost leaf of each of said groups being a master leaf, the outer portions of said groups being normally separated, the master leaf of the upper group having its ends curved downwardly and inwardly, the top leaf of the lower group having its ends bent away from the remaining leaves of the lower group and upwardly to a point above the ends of the master leaf of the upper group and a shackle connecting the said adjacent ends, the remaining leaves of the lower group having their outer ends curved downwardly.

In testimony whereof I affix my signature.

CONRAD MILLER.